D. C. CAMERER.
Car-Couplings.
No. 141,991.
Patented August 19, 1873.
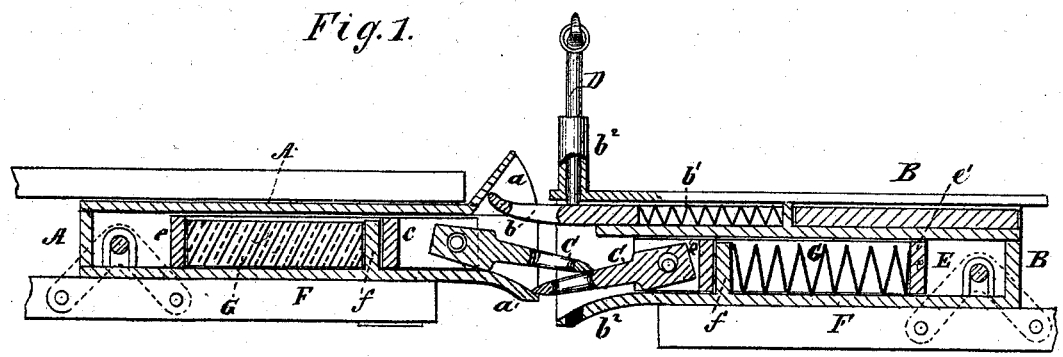
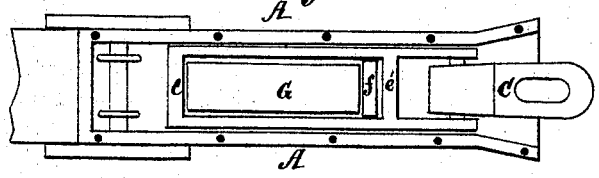
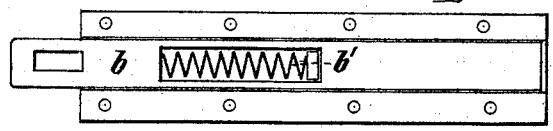
Witnesses:
G. Mathys
Solon C. Kemon
Inventor:
Daniel C. Camerer
Per
Attorneys.

UNITED STATES PATENT OFFICE.

DANIEL C. CAMERER, OF MARTINSBURG, PENNSYLVANIA.

IMPROVEMENT IN CAR-COUPLINGS.

Specification forming part of Letters Patent No. 141,991, dated August 19, 1873; application filed February 14, 1873.

*To all whom it may concern:*

Be it known that I, DANIEL C. CAMERER, of Martinsburg, in the county of Blair and State of Pennsylvania, have invented a new and useful Improvement in Car-Couplings; and I do hereby declare the following to be a full, clear, and exact description of the same, reference being had to the accompanying drawing forming a part of this specification, in which—

Figure 1 is a vertical longitudinal section of my improved draw-heads and car-couplers. Figs. 2 and 3 are horizontal sections of Fig. 1.

The invention consists in the improvement of car-couplings, as hereinafter described and pointed out in the claims.

In the drawing, A B represent two car-bumpers, which are relatively constructed to act in conjunction with each other. The bumper A has an upwardly-turned lip, $a$, which is upwardly inclined on the inside, and which receives the apertured upturned end of the pin-holder $b$, which is supported in the rear by a spring, $b^1$. The bumper A has also a lower lip, $a'$, downwardly inclined to receive and guide the link of opposite bumper. C C are coupling-links, loosely pivoted in the opposite draw-heads A B, so that it makes no difference which slides upon or above the other, since their apertures will always register with each other and with the hole in the holder $b$ of the coupling-pin D. With the draw-head B I cast the vertical tubular guide $b^2$, which prevents the pin from ever sagging, sticking, or falling too slowly. E is the sliding box, having partitions $e\ e'$; and F, the fixed bottom plate of draw-head, having the rigid vertical plate $f$, against which the spring G is fastened and compressed. This spring may be a spiral, as shown in draw-head B, or a rubber one, as shown in draw-head A.

Having thus described my invention, what I claim as new, and desire to secure by Letters Patent, is—

1. The links C C, pivoted to sliding boxes E E, the draw-heads A B, coupling-pin D, and the springs G G, all combined for operation as set forth.

2. In combination with the pivoted links C C and holder $b^1$, the sliding boxes E E, springs G G, and draw-heads A B, as and for the purpose specified.

D. C. CAMERER.

Witnesses:
 H. C. NICODEMUS,
 JOHN A. SHILLING.